United States Patent
Gilbert et al.

(10) Patent No.: US 10,740,665 B2
(45) Date of Patent: Aug. 11, 2020

(54) VISUAL AUTHENTICATION KEY FOR MATRIX BARCODE

(71) Applicant: DELL PRODUCTS, L.P., Round Rock, TX (US)

(72) Inventors: Matthew B. Gilbert, Austin, TX (US); Richard W. Guzman, Austin, TX (US); Scott C. Lauffer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/112,970

(22) Filed: Aug. 27, 2018

(65) Prior Publication Data

US 2020/0065637 A1 Feb. 27, 2020

(51) Int. Cl.
*G06K 19/06* (2006.01)

(52) U.S. Cl.
CPC .............................. *G06K 19/06037* (2013.01)

(58) Field of Classification Search
CPC ......... G06K 19/00; G06K 19/04; G06K 19/06
USPC ... 235/494, 487, 375, 492.09, 462.1, 462.09
See application file for complete search history.

(56) References Cited

U.S. PATENT DOCUMENTS

| 8,490,861 B1 | 7/2013 | Cidambi et al. |
| 9,946,963 B2 | 4/2018 | Samara et al. |
| 2015/0317955 A1* | 11/2015 | Tanaka .................... G06K 1/12 235/454 |
| 2016/0012324 A1* | 1/2016 | Eschbach ............... G06K 1/121 235/494 |
| 2016/0267369 A1* | 9/2016 | Picard .................. G06K 7/1417 |
| 2016/0269675 A1* | 9/2016 | Tsujimoto .............. H04N 5/772 |

* cited by examiner

*Primary Examiner* — Edwyn Labaze
(74) *Attorney, Agent, or Firm* — Isidore PLLC (57) ABSTRACT

A method for generating a matrix barcode key combination. The method includes receiving a request to secure at least a portion of data. In response to receiving the request to secure at least a portion of data, the method includes generating a matrix barcode that encodes the data, based on at least a first portion of content of the data. The method includes generating a matrix barcode key based on at least another portion of the content of the data. The method includes aligning the matrix barcode key with at least a portion of the matrix barcode to provide a matrix barcode key combination. The method includes enabling a requesting device to have access to the secured portion of encoded data, when the requesting device presents the matrix barcode key in an arrangement that aligns the matrix barcode key with the matrix barcode resulting in the matrix barcode key combination.

20 Claims, 7 Drawing Sheets

VISUAL AUTHENTICATION KEY FOR MATRIX BARCODE

1. TECHNICAL FIELD

The present disclosure generally relates to data security in an information handling system and in particular to using matrix barcodes for data security in an information handling system.

2. DESCRIPTION OF THE RELATED ART

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data generated by information handling systems can be represented in many ways. Often times, commercial industries publicly present data and/or information cryptically. This cryptic representation enables the commercial industry to internally track items to manage sales and/or inventory. For example, barcodes are utilized to cryptically store data associated with an item. Barcodes are machine-readable optical labels that contain information. Barcodes, such as specific types of matrix barcodes, are two-dimensional patterns that use four standardized encoding modes to efficiently store data. These four standardized encoding modes are numeric, alphanumeric, byte/binary, and kanji. Matrix barcodes have become increasingly utilized due to the fast readability and information storage capacity as compared to standard Universal Product Code (UPC) barcodes. UPC barcodes consist of twelve numeric digits that are uniquely assigned to a specified trade item. Along with similar coding platforms, like the European Article Number (EAN) barcode, UPC barcodes and matrix barcodes are utilized to provide access to generally known information. Different from UPC and EAN barcodes, matrix barcodes are also utilized to access websites more quickly, as well as to access advertisements. Due to the ease of accessing information encoded by matrix barcodes, matrix barcodes are less likely to be utilized for protecting information from unauthorized access.

BRIEF SUMMARY

Disclosed are an information handling system (IHS) and a method performed within an IHS for generating a matrix barcode key for secure access to protected information. The method includes receiving a request to secure at least a portion of data. In response to receiving the request to secure at least a portion of data, the method includes generating a matrix barcode that encodes the data, based on at least a first portion of content of the data. The method further includes generating, by a processor, a matrix barcode key based on at least another portion of the content of the data that is separate from the matrix barcode. The matrix barcode key includes at least a portion of a matrix barcode embedded therein that correlates to the first portion of content of the data to form a secure portion data. The method includes aligning the matrix barcode key with at least a portion of the matrix barcode to provide a matrix barcode key combination. The method also includes enabling a requesting device to have access to the secured portion of encoded data only when the requesting device presents the matrix barcode key in an arrangement that aligns the matrix barcode key with the matrix barcode, resulting in the matrix barcode key combination.

According to another embodiment, the IHS includes a processor, a memory system coupled to the processor, and a matrix barcode key utility stored on the memory system. The matrix barcode key utility is executed by the processor to cause the processor to receive a request to secure at least a portion of data. In response to receiving the request to secure at least a portion of data, the processor generates a matrix barcode that encodes the data, based on at least a first portion of content of the data. The processor further generates, a matrix barcode key based on at least another portion of content of the data. The matrix barcode key includes, embedded therein, at least a portion of a matrix barcode that correlates to the first portion of content of the data to form a secure portion data. The processor aligns the matrix barcode key with at least a portion of the matrix barcode to provide a matrix barcode key combination. The processor also enables a requesting device to have access to the secured portion of encoded data. The requesting device only has access when the requesting device presents the matrix barcode key in an arrangement that aligns the matrix barcode key with the matrix barcode resulting in the matrix barcode key combination.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

The illustrative embodiments provide an information handling system (IHS) and a method performed within an IHS for generating a matrix barcode key utilized to provide secure access to protected information. According to one aspect, the IHS includes a processor, a memory system coupled to the processor, and a matrix barcode key utility stored on the memory system. The matrix barcode key utility is executed by the processor to cause the processor to receive a request to secure at least a portion of data. In response to receiving the request to secure at least a portion of data, the processor generates a matrix barcode that encodes the data, based on at least a first portion of content of the data. The processor further generates, a matrix barcode key based on at least another portion of the content of the data. The matrix barcode key includes, embedded therein, at least a portion of a matrix barcode that correlates to the first portion of content of the data to form a secure portion data. The processor aligns the matrix barcode key with at least a portion of the matrix barcode to provide a matrix barcode key combination. The processor also enables a requesting device to have access to the secured portion of encoded data. The requesting device only has access when the requesting device presents the matrix barcode key in an arrangement that aligns the matrix barcode key with the matrix barcode resulting in the matrix barcode key combination. In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing module, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software modules, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 1:
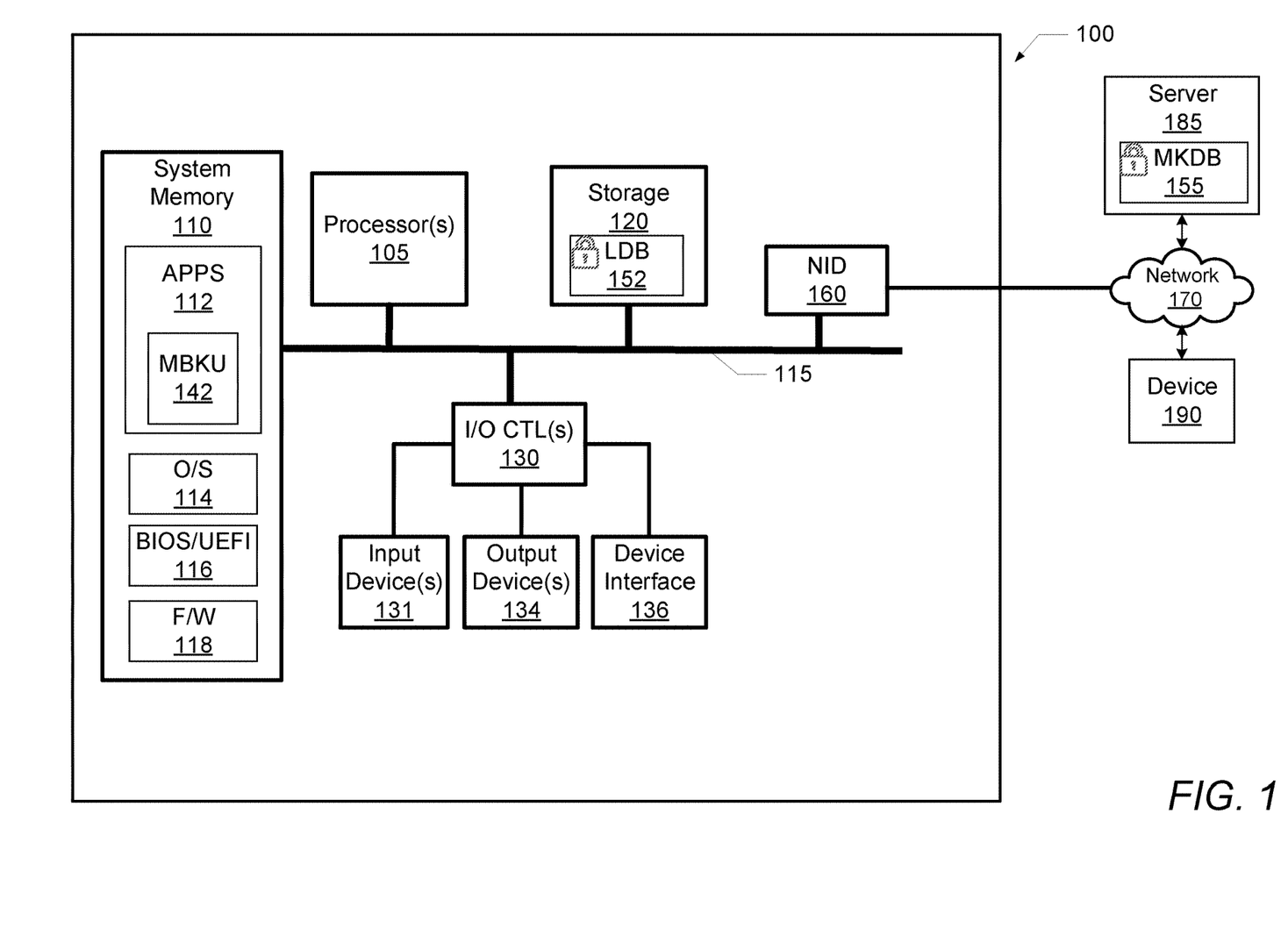
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated example IHS 100. Example IHS 100 includes one or more processor(s) 105 coupled to system memory 110 via system interconnect 115. System interconnect 115 can be interchangeably referred to as a system bus, in one or more embodiments. Also, coupled to system interconnect 115 is storage 120, within which can be stored one or more software and/or firmware modules and/or data (not specifically shown). In one embodiment, storage 120 can be hard drive or a solid-state drive. The one or more software and/or firmware modules within storage 120 can be loaded into system memory 110 during operation of IHS 100. In the illustrated embodiment, local database (LDB) 152 is stored within storage 120. In one embodiment, LDB 152 is a location-based operation mapping (LBOM) database. In an alternate embodiment, a database is also stored within server 185 as matrix key database (MKDB) 155. In still another embodiment, MKDB 155 is either stored in server 185 or storage 120.

As shown, system memory 110 can include therein a plurality of software and/or firmware modules, including application(s) 112, operating system (O/S) 114, basic input/output system/unified extensible firmware interface (BIOS/UEFI) 116, other firmware (F/W) 118. The various software and/or firmware modules have varying functionality when their corresponding program code is executed by processor(s) 105 or other processing devices within IHS 100. The software/firmware modules of IHS 100 further includes matrix barcode key utility (MBKU) 142. MBKU 142 may be provided as a separate application that is optionally located within system memory 110 and executed by processor 105. Within this embodiment, processor 105 executes MBKU 142 to provide the various methods and functions described herein. For simplicity, MBKU 142 is illustrated and described as a stand-alone or separate software/firmware/logic component, which provides the specific functions and methods described herein. However, in at least one embodiment, MBKU 142 may be a component of, may be combined with, or may be incorporated within OS 114, and/or with one or more applications 112. Additional aspects of MBKU 142, and functionality thereof, are presented within the description of FIGS. 2-7.

IHS 100 further includes one or more input/output (I/O) controllers 130 which support connection by, and processing of signals from, one or more connected input device(s) 131 such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, for connecting, without limitation, an optical reader, a card reader, Personal Computer Memory Card International Association (PCMCIA) port, and/or a high-definition multimedia interface (HDMI), can be associated with IHS 100. Device interface(s) 136 can be utilized to enable data to be read from, or stored to, corresponding removable storage device(s), such as a compact disk (CD), digital video disk (DVD), flash drive, or flash memory card. In one or more embodiments, device interface(s) 136 can also provide an integration point for connecting other device(s) to IHS 100. Device interface(s) 136 can further include General Purpose I/O interfaces such as $I^2C$, System Management Bus (SMBus), and peripheral component interconnect (PCI) buses, et al.

IHS 100 further comprises a network interface device (ND) 160. ND 160 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet. For example, network 170 is connected to server 185 and device 190. Server 185 includes MKDB 155, within which is remotely stored matrix barcode keys and matrix barcode key combinations. The matrix barcode keys and matrix barcode key combinations are received by device 190 at matrix key database (MKDB) 155. Device 190 can be a device similar to IHS 100 or a differently configured and/or functional device, as will be presented in further detail below.

Figure 2:
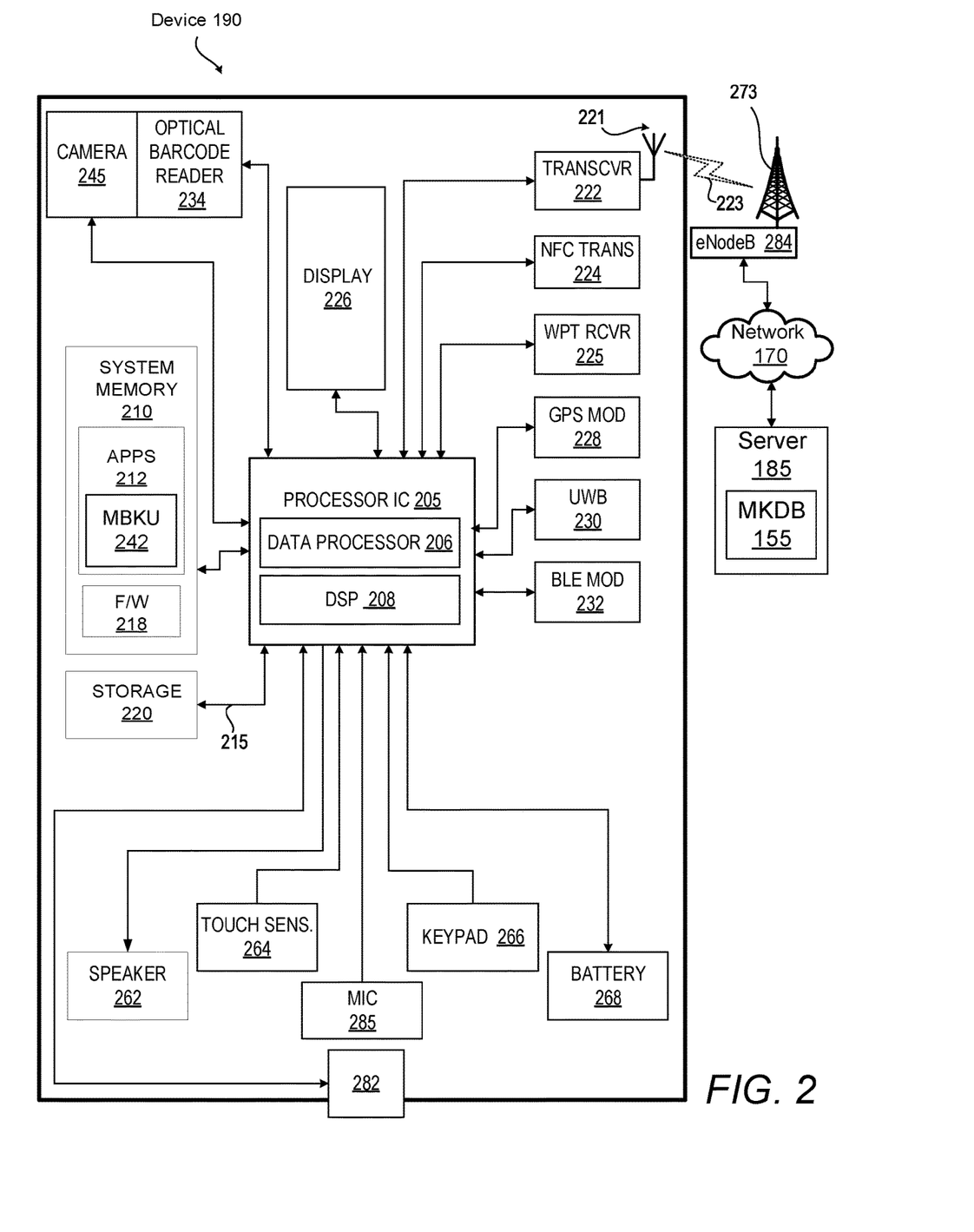
FIG. 2 illustrates an example device utilized as an optical reader for a matrix barcode key combination in accordance with one or more embodiments.

With reference now to FIG. 2, there is illustrated an example device for use as an optical reader for a matrix barcode key combination in accordance with one or more embodiments. Device 190 includes at least one processor integrated circuit (IC) 205. Included within processor IC 205 are data processor 206 and digital signal processor (DSP) 208. Processor IC 205 is coupled to system memory 210 and non-volatile storage 220 via a system communication mechanism, such as system interconnect 215. One or more software and/or firmware modules can be loaded into system memory 210 during operation of device 190. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor IC 205 or by secondary processing devices within device 190.

Processor IC 205 supports connection by and processing of signals from one or more connected input/output devices, such as display 226, camera 245, speaker 262, touch sensor 264, keypad 266, and microphone 285. Additionally, in one or more embodiments, one or more devices connect to processor IC 205 via device interface 282. For example, a universal serial bus (USB), a card reader, Personal Computer Memory Card International Association (PCMIA) slot, and/or a high-definition multimedia interface (HDMI), can be associated with device 190 via device interface 282. Device 190 also contains a power source such as a battery 268 that supplies power to device 190.

Device 190 further includes antenna 221 connected to transceiver 222. Also included within device 190 are near field communication transceiver (NFC TRANS) 224, wireless power transfer receiver (WPT RCVR) 225, global positioning system module (GPS MOD) 228, ultra-wideband (UWB) transceiver 230, Bluetooth Low Energy (BLE)

module 232, and optical barcode reader 234, all of which are communicatively coupled to processor IC 205.

In one embodiment, optical barcode reader 234 is connected to and/or utilizes devices associated with camera 245. For example, optical barcode reader 234 utilizes a lens, a light source, and a light sensor associated with camera 245. In another embodiment, optical barcode reader 234 is a separate device connected to processor IC 205 via device interface 282. Optical barcode reader 234 can consist of a light source (typically a light emitting diode (LED) or laser source), a lens, and a light sensor to convert optical impulses to electrical signals. The electrical signals are then converted into digital numerical values usable by processor IC 205. In still another embodiment, processor IC 205 is configured to analyze the data associated with an image of a matrix barcode that is collected by camera 245. Optical barcode reader 234 and/or camera 245 scan the matrix barcode. Processor IC 205 collects optical impulses based on the scanned image. Processor IC 205 analyzes the image data collected from a matrix barcode. Processor IC 205 and/or optical barcode reader 234 translates the optical impulses into electrical signals that correlate to data stored on MKDB 155.

Transceiver 222 allows for wide-area or local wireless communication, via wireless signal 223, between device 190 and evolved node B (eNodeB) 284, which includes antenna 273. Device 190 is capable of wide-area or local wireless communication with other wireless devices or with eNodeB 284 as a part of a wireless communication network. Device 190 communicates with other wireless devices by utilizing a communication path involving transceiver 222, antenna 221, wireless signal 223, antenna 273, and eNodeB 284. In one embodiment, other devices within device 190 utilize antenna 221 to send and/or receive signals in the form of radio waves. For example, GPS module 228 communicatively couples to antenna 221 to receive location data. UWB transceiver 230 communicatively couples to antenna 221 and uses radio technology that can operate with very low energy levels to send and/or receive high-bandwidth communications within an approximated range.

Device 190 is presented as a wireless communication device. As a wireless device, device 190 can communicate data over wireless network 170. For example, device 190 transmits data to and/or receives data from MKDB 155 within server 185. As provided by FIG. 2, device 190 additionally includes MBKU 242 which executes on processor IC 205 to enable the processing of data received from camera 245. In at least one embodiment, MBKU 242 may be a component of, may be combined with, or may be incorporated within one or more applications 212. As will be discussed further, processor IC 205 provides data and receives data from MKDB 155. MBKU 242 enables device 190 to access secure information on MKDB 155 in response to a verified matrix barcode key combination being detected by camera 245. Device 190 and components thereof are further discussed in FIG. 3.

Figure 3:
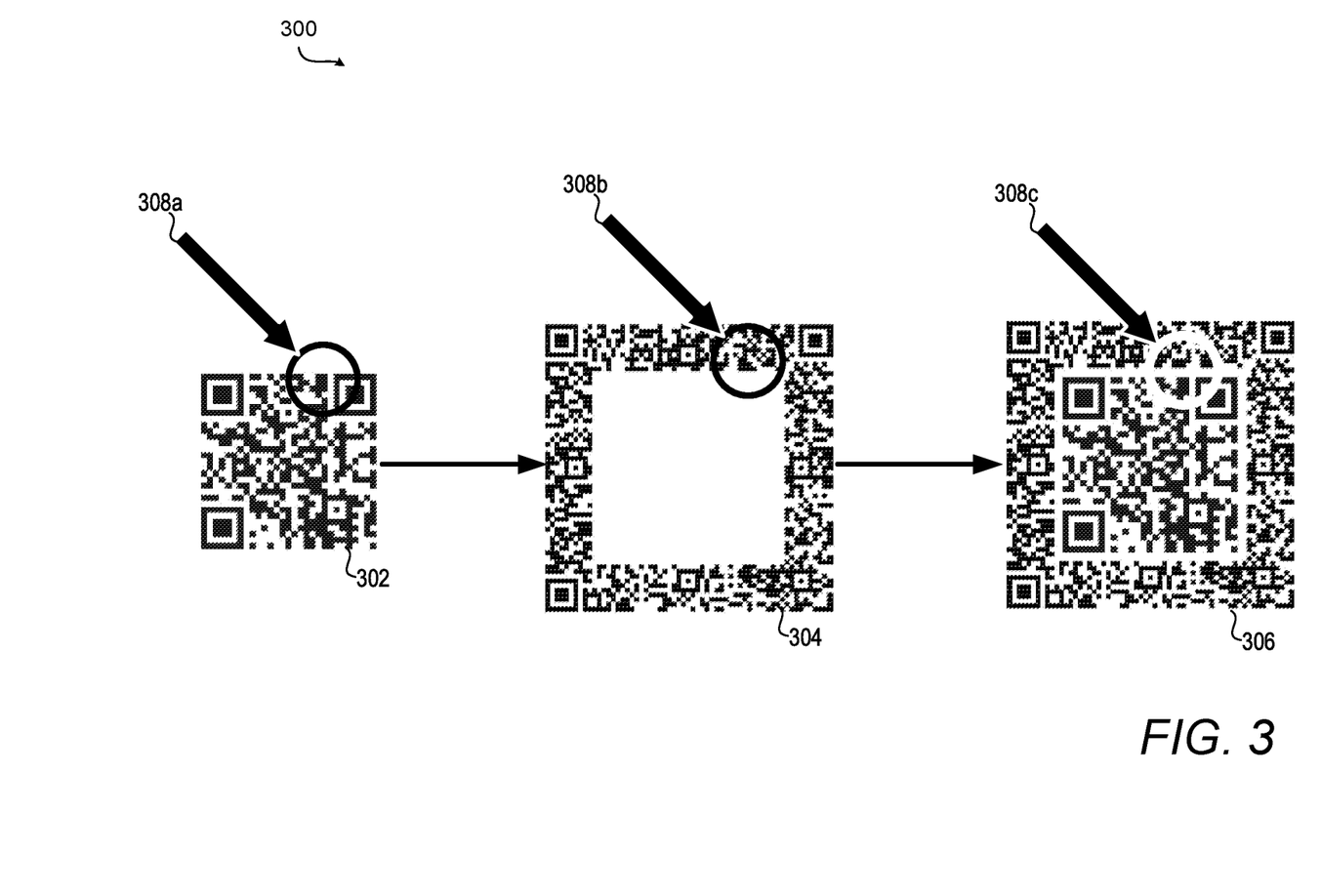
FIG. 3 illustrates an example matrix barcode, matrix barcode key, and resulting matrix barcode key combination, in accordance with one or more embodiments.

FIG. 3 illustrates an example matrix barcode, matrix barcode key, and matrix barcode key combination in accordance with one embodiment. Example matrix barcode key group 300 includes matrix barcode 302, matrix barcode key 304, matrix barcode key combination 306, and alignment area 308.

In operation, processor 105 receives matrix barcode 302, which is an existing barcode that correlates to specified data. In another embodiment, processor 105 generates matrix barcode 302. Matrix barcode 302 is a machine-readable optical label that includes encoded alphanumeric characters. Processor 105 selects at least one image and/or text feature associated with matrix barcode 302 to use as an alignment mark 308a. Processor 105 generates matrix barcode key 304, based, at least in part, on barcode alignment mark 308a that is associated with matrix barcode 302. Matrix barcode key 304 includes key alignment mark 308b. In response to forming matrix barcode key 304, processor 105 generates matrix barcode key combination 306. Matrix barcode key combination 306 includes alignment combination 308c. More specifically, at least a portion of matrix barcode key 304 (barcode alignment mark 308b) and a portion of matrix barcode 302 (key alignment mark 308a) align to provide matrix barcode key combination 306. Processor 105 determines a positional configuration for matrix barcode 302 and matrix barcode key 304 to provide a matrix barcode key combination that enables access to the encoded data. In one embodiment, processor 105 generates matrix barcode 302 and matrix barcode key 304 together to form matrix barcode key combination 306. Processor 105 then temporarily disjoins matrix barcode key 304 from matrix barcode key combination 306 to form a secured portion of the encoded data. In another embodiment, processor 105 generates matrix barcode key 304 by aligning at least a portion of matrix barcode 304 with a second matrix barcode in an overlay configuration resulting in matrix barcode key combination 306.

In still another embodiment, processor 105 augments, at least in part, a configuration of a preexisting matrix barcode to generate an augmented matrix barcode. For example, a section of a preexisting matrix barcode, such as matrix barcode 302, is extracted from matrix barcode 302 to form matrix barcode key 304. The extracted matrix barcode is used as matrix barcode key 304, and the preexisting matrix barcode and the extracted matrix barcode provide the matrix barcode key combination 306. In still another embodiment, processor 105 generates matrix barcode key 304 for matrix barcode key combination 306 by performing one of: (i) adding supplemental characters to matrix barcode 302 and (ii) modifying characters of matrix barcode 302.

In one embodiment, in response to a request to secure at least a portion of data, processor 105 embeds, into matrix barcode key 304, at least a portion of a matrix barcode that correlates to at least a portion of the data to form the matrix barcode key combination 306. The portion of matrix barcode 302 that correlates to at least a portion of the data includes encoded alphanumeric characters of the data. The encoded alphanumeric characters are embedded in the matrix barcode key in the form of black and white cells or modules arranged in either square or rectangular patterns. The encoded alphanumeric characters within matrix barcode key 304 align with correlating encoded alphanumeric characters in matrix barcode 302. The data, embedded to the matrix barcode key, forms a secure portion of data. Processor 105 enables a requesting device, such as device 190, to have full access to the secure portion of data only when the requesting device presents matrix barcode key 304 in an arrangement that aligns matrix barcode key 304 with matrix barcode 302 resulting in matrix barcode key combination 306. In one embodiment, barcode alignment mark 308a aligns with key alignment mark 308b in a predetermined arrangement. The combination of the alignment marks (308a and 308b) as well as matrix barcode 302 and matrix barcode key 304 positioned in the predetermined arrangement enables access to the secure portion of data, which is stored within MKDB 155 and/or LDB 152. The embedded data is associated with the specified key combination. In another embodiment, MBKU 142 enables processor IC 205 to decode matrix barcode key combination 306 to reveal the secure data.

Figure 4:
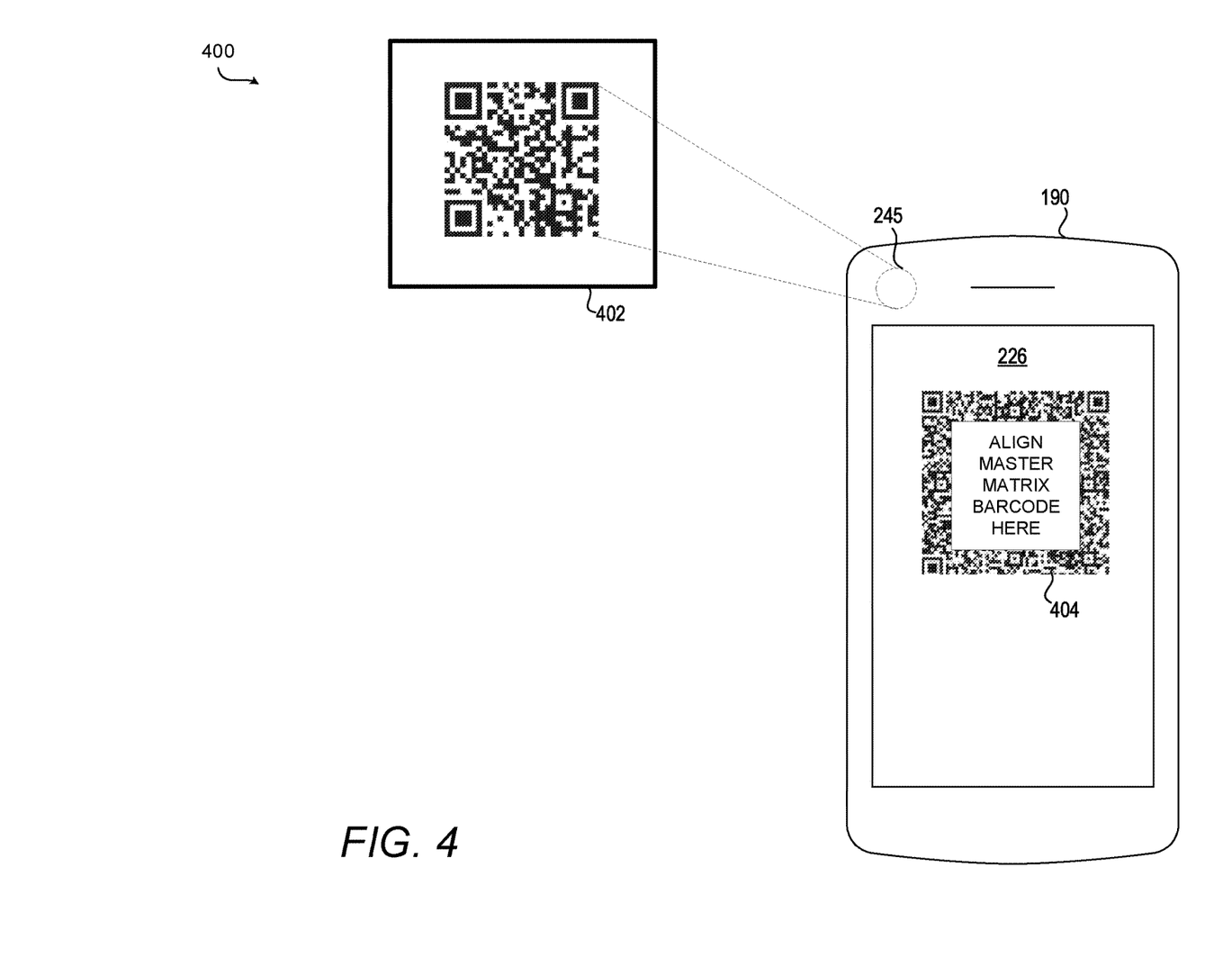
FIG. 4 is an example matrix barcode and matrix barcode key reading environment, in accordance with one embodiment.

FIG. 4 is an example matrix barcode and matrix barcode key reading environment, in accordance with one embodiment. Matrix barcode key reading environment 400 includes preselected matrix barcode 402 and device 190. Device 190 includes display 226 and camera 245. Device 190 receives preselected matrix barcode key 404 from, for example, IHS 100.

In one embodiment, a user of device 190 receives preselected matrix barcode key 404 via a secure electronic messaging system. Preselected matrix barcode key 404 is a part of a preselected matrix barcode key combination, and is respectively linked to at least a portion of secure data. For example, preselected matrix barcode key 404 is delivered to a private electronic mailing account that is accessible by a user of device 190. The user accesses matrix barcode key 304 utilizing a username and password. Using a compatible optical reader, for example, optical barcode reader 234, and camera 245 provided by device 190, a user aligns matrix barcode 402 with preselected matrix barcode key 404. A display device, e.g., display 226, communicatively coupled to a lens of camera 245, displays preselected matrix barcode key 404. Outputting preselected matrix barcode key 404 on display 226 enables visual alignment of preselected matrix barcode key 404 with preselected matrix barcode 402. Visually aligning preselected matrix barcode key 404 with preselected matrix barcode 402 enables a user to assemble the matrix barcode key combination which, if valid, enables access to the secure portion of correlating data within LDB 152 and/or MKDB 155.

In another embodiment, processor 105 receives a request to access a portion of secure data stored on LDB 152. Processor 105 prompts the requesting device, device 190, to align preselected matrix barcode key 404 with preselected matrix barcode 402. Preselected matrix barcode 402 is at least one part of the preselected matrix barcode key combination (306). In one embodiment, processor 105 also identifies when an alignment of preselected matrix barcode 402 and preselected matrix barcode key 404 matches the preselected matrix barcode key combination (306) to determine validity of the matrix barcode key combination. In response to identifying that the alignment of preselected matrix barcode key 404 and preselected matrix barcode 402 matches the preselected matrix barcode key combination (306), processor 105 automatically outputs the secure portion of the data to a display device, such as display 226. In still another embodiment, in response to identifying that the alignment of preselected matrix barcode key 404 and preselected matrix barcode 402 matches the preselected matrix barcode key combination (306), MBKU 142 enables processor IC 205 to decode matrix barcode key combination 306. Processor IC 205 outputs the decoded data on display 226 to reveal the secure data to a user of electronic device 190.

Figure 5A:
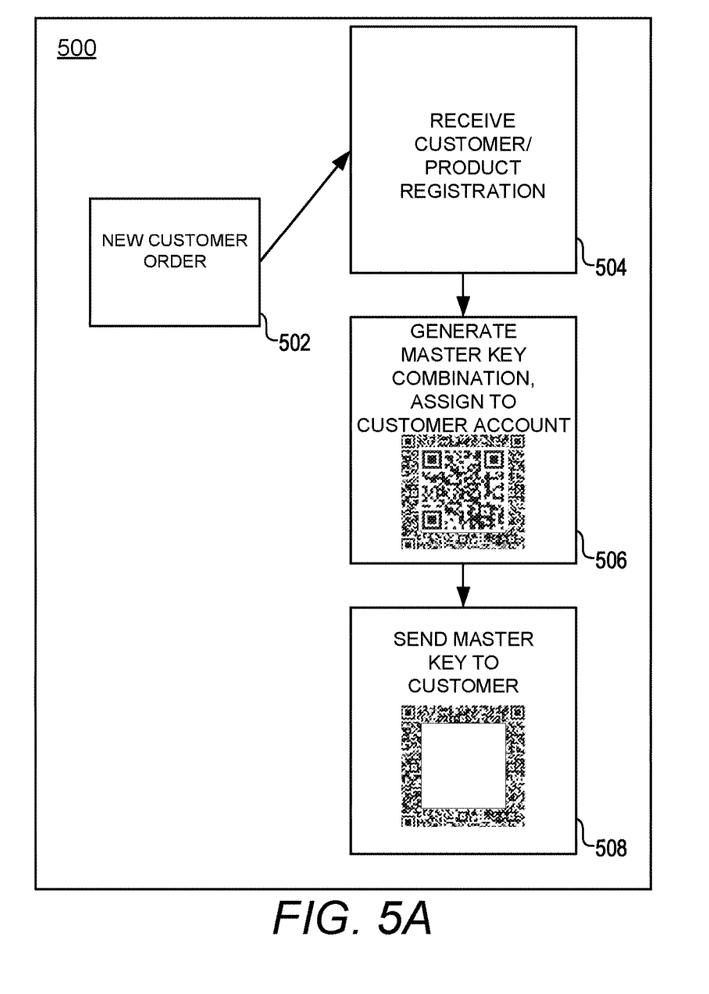
FIG. 5A is a work flow diagram illustrating an example method for linking data to a matrix barcode key to generate secure data, according to one or more embodiments.

FIG. 5A is a work flow diagram illustrating an example method for associating secure data to a matrix barcode key (304), according to one or more embodiments. Example matrix barcode key associating workflow 500 utilizes matrix barcode key 304 to secure customer information received in a new customer order (502). In one embodiment, a customer purchases a product. The product and/or components of the product have additional information associated therewith. However, in the hands of the wrong individual, the associated information can create security vulnerabilities. For example, a serial number and service tag is useful to a new customer during servicing and part replacement or for warranty incentives. In the hands of the wrong individual, the parts can be targeted by malware and/or for intentional corruption.

Processor 105 initiates example matrix barcode key associating workflow 500 when processor receives customer order, at block 502. Processor 105 receives customer and/or product registration associated with the customer order, at block 504. Processor 105 generates a master matrix barcode key combination and assigns the master matrix barcode key combination to the customer account and/or customer account information, at block 506. Instead of providing a username and password to retrieve the account information, processor 105 provides the matrix barcode key portion of the matrix barcode key combination for transmission to customer, at block 508. Processor 105 electronically sends the master matrix barcode key (304) to the customer.

Figure 5B:
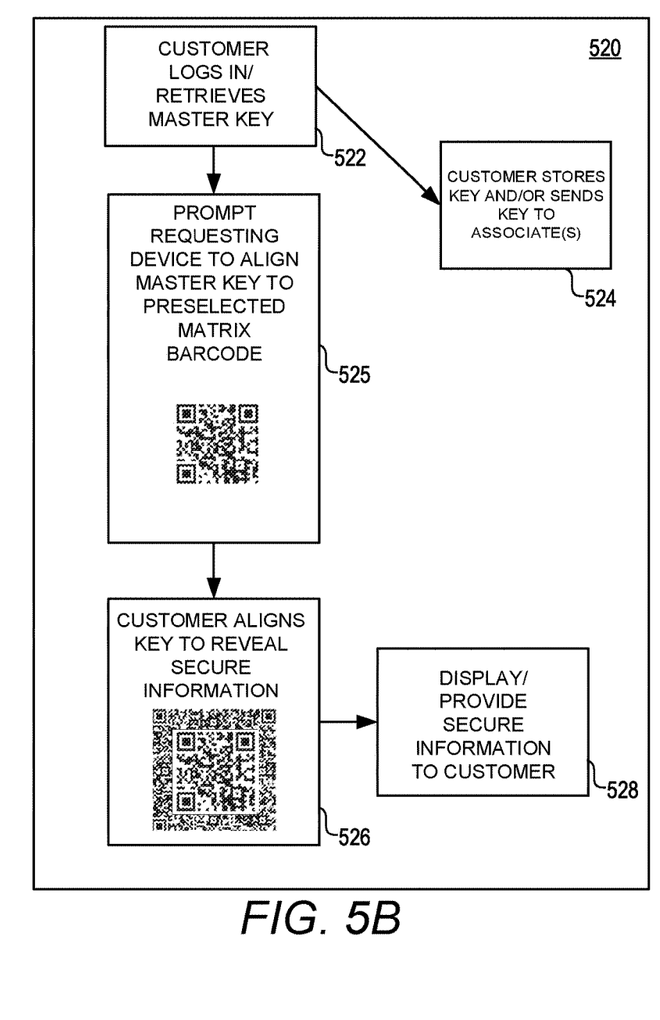
FIG. 5B is a work flow diagram illustrating an example method for accessing secure data utilizing the matrix barcode key, according to one or more embodiments.

FIG. 5B is a work flow diagram illustrating an example method for accessing secure data utilizing the matrix barcode key (304), according to one or more embodiments. Example matrix barcode key access workflow 520 utilizes master matrix barcode key (304) to access secure customer information. In one embodiment, a customer logs into an electronic messaging system, such as an electronic mail account to retrieve the master matrix barcode key (304), at block 522. In the presented embodiment, the customer can store and/or send the master matrix barcode key for use by other associates, at block 524. In another embodiment, the master matrix barcode key is temporal, and will regenerate after a predetermined time. In yet another embodiment, processor 105 deactivates the matrix barcode key after a predetermined usage allocation. With this embodiment, processor 105 generates a new matrix barcode key after the predetermined usage allocation, and the new matrix barcode key replaces the deactivated matrix barcode key. Following each generation of a new matrix barcode key, processor 105 distributes the new matrix barcode key to an approved user via an electronic messaging system.

At block 525, processor 105 prompts the requesting device (190) to align the preselected matrix barcode key with a preselected matrix barcode, where the preselected matrix barcode is at least one part of the preselected matrix barcode key combination. At block 526, utilizing a camera device and/or a compatible optical barcode reader, a customer visually aligns the master matrix barcode key with the master matrix barcode. In one embodiment, the matrix barcode (302) of the matrix barcode key combination is attached to a component of the purchased product for access by a camera lens and/or optical reader. For example, the matrix barcode (302) is affixed to a panel outside of a computer chassis. In one embodiment, the master matrix barcode key is an overlay image that modifies and/or augments the master matrix barcode to form a new matrix barcode combination. Processor 105 generates the matrix barcode key (304) by aligning at least a portion of a first matrix barcode with a second matrix barcode in an overlay configuration resulting in the matrix barcode key combination. In another embodiment, the master matrix barcode key completes a pattern associated with the matrix barcode (302) to generate a matrix barcode key combination. In response to a matching master matrix barcode key and a recognized alignment of the master matrix barcode key (304) and master matrix barcode (302), at block 528, processor 105 enables access to secure data on a database, such as MKDB 155.

Figure 6:
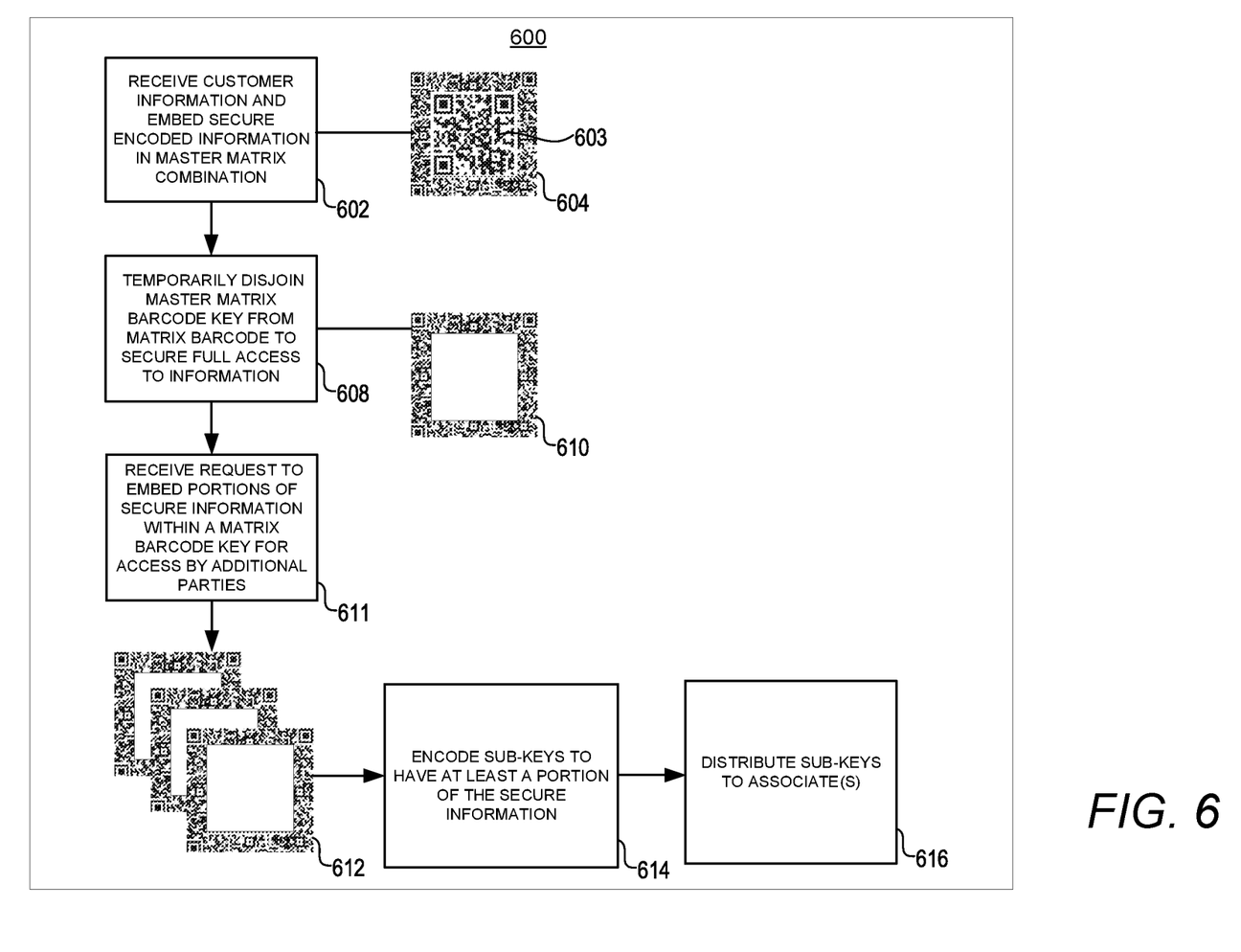
FIG. 6 is a work flow diagram illustrating an example method for generating a plurality of matrix barcode sub-keys, according to one or more embodiments.

FIG. 6 is a work flow diagram illustrating an example method for generating a plurality of matrix barcode sub keys, according to one or more embodiments. The example matrix barcode sub-key distribution workflow 600 enables matrix barcode sub-keys to have limited access to the confidential and/or secure information. For instance, customer account information can include billing instructions and/or credit card information along with component serial numbers and service tags.

In response to a request by a customer to share customer account information, a sub key (or sub keys), associated with the shareable information, is assigned to the customer account. In one embodiment, processor 105 receives customer information at block 602. Processor 105 associates the customer information to master matrix barcode key combination 604 by embedding the secure encoded information in master matrix barcode key combination 604. At block 608, processor 105 temporarily disjoins master matrix barcode key 610 from matrix barcode key 603 to secure full access to information associated with master matrix barcode key combination 604. In response to a request to embed portions of secure information within a matrix barcode key for access by additional parties, at block 611, processor 105 generates at least one matrix barcode sub-key 612 that is associated with matrix barcode key combination 604. At block 614, one or more of matrix barcode sub-key 612 are respectively encoded with portions of the secure encoded information. Matrix barcode sub-keys 612 provide access to a predetermined subset of data that is different from the full complement of secure portion of data. Processor 105 distributes matrix barcode sub-keys 612 to at least one customer via an electronic messaging system, at block 616.

According to one embodiment, a processor, such as processor 105, generates matrix barcode sub-keys 612 from at least a portion of data that is stored in LDB 152 and/or MKDB 155. The portion of data utilized to generate matrix barcode sub-keys 612 can be a portion of the data utilized to generate master matrix barcode key 610. At least one of matrix barcode sub-keys 610 can overlay matrix barcode 603 to form matrix barcode key combination 604. Matrix barcode sub-keys 612 enable access to less information than master matrix barcode key 610. Matrix barcode sub-keys 612 advantageously enable a sub-user access to a portion of secure data that is stored on MKDB 155. Additionally, master matrix barcode key 610 can still enable full access to a full portion of secure data to a user that has been provided master matrix barcode key 610.

Figure 7:
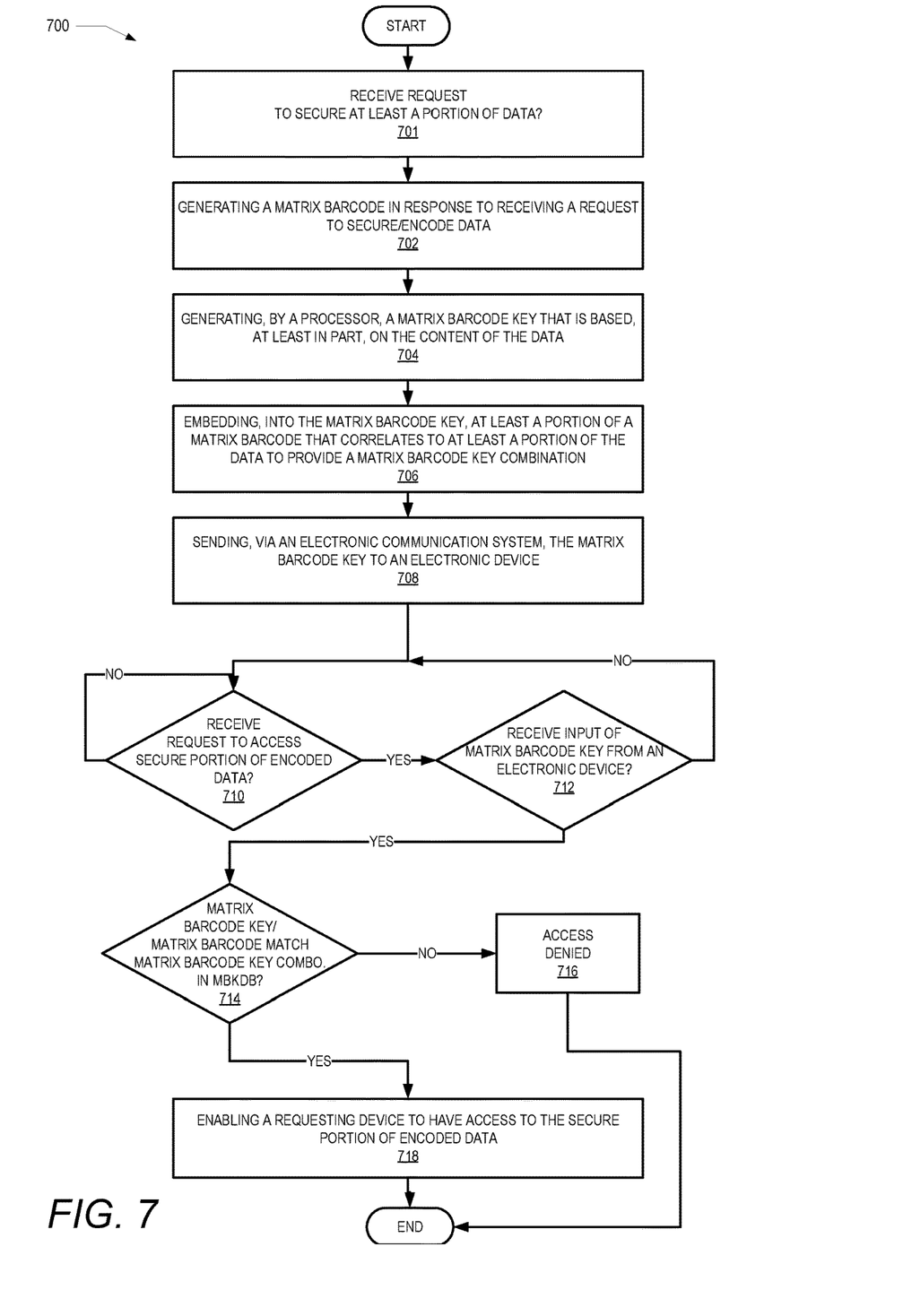
FIG. 7 is a flow chart illustrating an example of a method for generating a matrix barcode key, according to one or more embodiments.

FIG. 7 illustrates a flowchart of an exemplary method 700 by which processor 105 within the preceding figures performs different aspects of the processes that enable the one or more embodiments of the disclosure. Generally, method 700 represents computer-implemented method for generating a matrix barcode key and matrix barcode key combination. The description of method 700 is provided with general reference to the specific components illustrated within the preceding FIGS. 1-6. Method 700 is described as being implemented via processor 105 and particularly the execution by processor 105 of code provided by MBKU 142 executed. It is however appreciated that certain aspects of the described methods may be implemented via other processing devices and/or execution of other code.

Turning now to FIG. 7, method 700 begins at the start block and proceeds to block 701 at which processor 105 receives a request to secure a portion of data that is received at processor 105 and is selected for protection. At block 702, processor 105 receives a request to encode alphanumeric characters of the data. Processor 105 generates a matrix barcode in response to the request by embedding the encoded alphanumeric characters in the matrix barcode in the form of black and white cells or modules arranged in either square or rectangular patterns. The data, for example, is associated with a user account, customer information, product information, object information. Processor 105 generates, by the processor, a matrix barcode key that is based, at least in part, on the content of the data, at block 704. The matrix barcode key includes encoded alphanumeric characters of the data that correlate with the encoded data of the matrix barcode. More specifically, at block 706, processor 105 embeds at least a portion of a matrix barcode that correlates to at least a portion of the data associated with the matrix barcode into the matrix barcode key. The matrix barcode key aligns with at least a portion of the matrix barcode to provide a matrix barcode key combination. Processor 105 sends the matrix barcode key to an electronic device, via an electronic communication system, at block 708. At block 710, processor 105 determines whether a request is received to access a secure portion of the data. In response to no request to access a secure portion of data being received, the process returns to block 710. In response to the request to access a secure portion of data being received, the process continues to block 712. At block 712, a decision is made as to whether processor 105 receives input of a matrix barcode key from an electronic device. In response to no matrix barcode key being received from an electronic device, the process returns to block 710. In response to a matrix barcode key being received from an electronic device, the process continues to block 714. A decision is made at block 714 whether the matrix barcode (302) and matrix barcode key (304) align, resulting in the matrix barcode key combination (306) as compared to a respective matrix barcode key combination in LDB 152 and/or MKDB 155. In response to the matrix barcode (302) and matrix barcode key (304) not aligning, method includes denying access to the data at block 716. In response to the matrix barcode (302) and matrix barcode key (304) aligning to provide the matrix barcode key combination, at block 718, processor 105 enables access by the requesting device to the secure portion of the data. The process concludes at the end block.

In the above described flow chart, the method may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for generating a matrix barcode key in an information handling system (IHS), the method comprising:
   receiving a request to secure at least a portion of data;
   in response to receiving the request, generating a matrix barcode that encodes the data, based on at least a first portion of content of the data;
   generating, by a processor, a matrix barcode key based on at least another portion of the content of the data, the matrix barcode key having embedded therein at least a portion of a matrix barcode that correlates to the first portion of content of the data to form a secure portion data that is separate from the matrix barcode;
   aligning the matrix barcode key with at least a portion of the matrix barcode to provide a matrix barcode key combination; and
   enabling a requesting device to have access to a secured portion of encoded data only when the requesting device presents the matrix barcode key in an arrangement that aligns the matrix barcode key with the matrix barcode, resulting in the matrix barcode key combination.

2. The method of claim 1, wherein the matrix barcode is a machine-readable optical label and in response to a compatible optical reader recognizing the matrix barcode key combination, enabling access, via the processor, to the secured portion of encoded data.

3. The method of claim 1, further comprising:
providing a preselected matrix barcode key to a user via an electronic messaging system, wherein the preselected matrix barcode key is a part of a preselected matrix barcode key combination, and is respectively associated with the portion of the secure data;
receiving, at the processor, a request to access the portion of the secure data;
prompting the requesting device to align the preselected matrix barcode key with a preselected matrix barcode, wherein the preselected matrix barcode is at least one part of the preselected matrix barcode key combination; and
identifying when an alignment of the preselected matrix barcode key and the preselected matrix barcode matches the preselected matrix barcode key combination to determine validity of the matrix barcode key combination.

4. The method of claim 3, wherein in response to identifying the alignment of the preselected matrix barcode key and the preselected matrix barcode matches the preselected matrix barcode key combination, automatically outputting the secured portion of the data to a display device.

5. The method of claim 1, wherein a display device communicatively coupled to a camera lens displays the matrix barcode key to enable visual alignment of the matrix barcode key with the matrix barcode to assemble the matrix barcode key combination.

6. The method of claim 1, further comprising: augmenting, at least in part, a configuration of a preexisting matrix barcode to generate an augmented matrix barcode to be used as the matrix barcode key, wherein the preexisting matrix barcode and the augmented matrix barcode provide the matrix barcode key combination.

7. The method of claim 1, further comprising generating at least one matrix barcode sub-key that correlates to the matrix barcode key combination, wherein the matrix barcode sub-key provides access to a predetermined subset of data that is different from the secured portion of data.

8. The method of claim 1, further comprising:
deactivating the matrix barcode key after a predetermined usage allocation;
generating a new matrix barcode key after the predetermined usage allocation, wherein the new matrix barcode key replaces the deactivated matrix barcode key; and
distributing the new matrix barcode key to an approved user via an electronic messaging system.

9. The method of claim 1, further comprising generating the matrix barcode key by aligning at least a portion of a first matrix barcode with a second matrix barcode in an overlay configuration resulting in the matrix barcode key combination.

10. The method of claim 1, further comprising generating the matrix barcode key for the matrix barcode key combination by performing one of: (i) adding supplemental characters to the matrix barcode and (ii) modifying characters of the matrix barcode.

11. An Information Handling System (IHS) comprising:
a processor;
a memory system coupled to the processor; and
a matrix barcode key utility stored on the memory system that is executed by the processor to cause the processor to:
receive a request to secure at least a portion of data;
in response to receiving the request, generate a matrix barcode based on at least a first portion of content of the data;
generate, by a processor, a matrix barcode key based on at least another portion of the content of the data;
align the matrix barcode key with at least a portion of the matrix barcode to provide a matrix barcode key combination; and
enable a requesting device to have access to a secured portion of encoded data only when the requesting device presents the matrix barcode key in an arrangement that aligns the matrix barcode key with the matrix barcode resulting in the matrix barcode key combination.

12. The IHS of claim 11, wherein the matrix barcode is a machine-readable optical label and in response to a compatible optical reader recognizing the matrix barcode key combination, the matrix barcode key utility causes the processor to enable access to the secured portion of encoded data via the processor.

13. The IHS of claim 11, wherein the matrix barcode key utility causes the processor to:
provide a preselected matrix barcode key to a user via an electronic messaging system, wherein the preselected matrix barcode key is a part of a preselected matrix barcode key combination, and is respectively associated with the portion of secure data;
receive, at the processor, a request to access the portion of the secure data;
prompt the requesting device to align the preselected matrix barcode key with a preselected matrix barcode, wherein the preselected matrix barcode is at least one part of the preselected matrix barcode key combination; and
identify when the preselected matrix barcode key and the preselected matrix barcode align to match the preselected matrix barcode key combination to determine validity of the matrix barcode key combination.

14. The IHS of claim 13, wherein in response to identifying the preselected matrix barcode key and the preselected matrix barcode align to match the preselected matrix barcode key combination, the matrix barcode key utility causes the processor to automatically output the secured portion of the data to a display device.

15. The IHS of claim 11, wherein a display device communicatively coupled to a camera lens displays the matrix barcode key to enable visual alignment of the matrix barcode key with the matrix barcode to assemble the matrix barcode key combination.

16. The IHS of claim 11, wherein the matrix barcode key utility causes the processor to augment, at least in part, a configuration of a preexisting matrix barcode to generate an augmented matrix barcode to be used as the matrix barcode key, wherein the preexisting matrix barcode and the augmented matrix barcode provide the matrix barcode key combination.

17. The IHS of claim 11, wherein the matrix barcode key utility causes the processor to generate at least one matrix barcode sub-key that correlates to the matrix barcode key combination, wherein the matrix barcode sub-key provides access to a predetermined subset of data that is different from the secured portion of data.

18. The IHS of claim 11, wherein the matrix barcode key utility causes the processor to:
- deactivate the matrix barcode key after a predetermined usage allocation;
- generate a new matrix barcode key after the predetermined usage allocation, wherein the new matrix barcode key replaces the deactivated matrix barcode key; and
- distribute the new matrix barcode key to an approved user via an electronic messaging system.

19. The IHS of claim 11, wherein the matrix barcode key utility causes the processor to generate the matrix barcode key by aligning at least a portion of a first matrix barcode with a second matrix barcode in an overlay configuration resulting in the matrix barcode key combination.

20. The IHS of claim 11, wherein the matrix barcode key utility causes the processor to generate the matrix barcode key for the matrix barcode key combination by performing one of: (i) adding supplemental characters to the matrix barcode and (ii) modifying characters of the matrix barcode.

\* \* \* \* \*